US011319502B2

(12) United States Patent
Doucet et al.

(10) Patent No.: US 11,319,502 B2
(45) Date of Patent: May 3, 2022

(54) USE OF BIODEGRADABLE HYDROCARBON FLUIDS FOR ALUMINIUM COLD-ROLLING

(71) Applicant: TOTAL MARKETING SERVICES, Puteaux (FR)

(72) Inventors: Clarisse Doucet, Levallois Perret (FR); Laurent Germanaud, Valencin (FR); Aloïs Joassard, Nanterre (FR)

(73) Assignee: TOTAL MARKETING SERVICES, Puteaux (FR)

( * ) Notice: Subject to any disclaimer, the term of this patent is extended or adjusted under 35 U.S.C. 154(b) by 287 days.

(21) Appl. No.: 16/344,868

(22) PCT Filed: Oct. 26, 2017

(86) PCT No.: PCT/EP2017/077457
§ 371 (c)(1),
(2) Date: Apr. 25, 2019

(87) PCT Pub. No.: WO2018/078022
PCT Pub. Date: May 3, 2018

(65) Prior Publication Data
US 2019/0264120 A1  Aug. 29, 2019

(30) Foreign Application Priority Data

Oct. 27, 2016  (EP) .................................... 16196116

(51) Int. Cl.
| *C10M 101/02* | (2006.01) |
|---|---|
| *C10G 45/00* | (2006.01) |
| *C10G 3/00* | (2006.01) |
| *C10M 107/02* | (2006.01) |
| *B21B 3/00* | (2006.01) |
| *C10N 20/02* | (2006.01) |
| *C10N 20/00* | (2006.01) |
| *C10N 30/02* | (2006.01) |
| *C10N 30/00* | (2006.01) |
| *C10N 40/22* | (2006.01) |
| *C10N 40/24* | (2006.01) |
| *C10N 40/20* | (2006.01) |

(52) U.S. Cl.
CPC ............ *C10M 101/02* (2013.01); *C10G 3/50* (2013.01); *C10G 45/00* (2013.01); *C10M 107/02* (2013.01); *B21B 2003/001* (2013.01); *C10M 2203/1025* (2013.01); *C10M 2203/1065* (2013.01); *C10M 2205/173* (2013.01); *C10N 2020/02* (2013.01); *C10N 2020/071* (2020.05); *C10N 2020/081* (2020.05); *C10N 2030/02* (2013.01); *C10N 2030/40* (2020.05); *C10N 2030/43* (2020.05); *C10N 2030/64* (2020.05); *C10N 2040/22* (2013.01); *C10N 2040/24* (2013.01); *C10N 2040/243* (2020.05); *C10N 2040/245* (2020.05); *Y02P 30/20* (2015.11)

(58) Field of Classification Search
CPC .......... C10M 101/02; C10N 2020/071; C10N 2020/081; C10N 2040/24; C10N 2040/243; C10N 2040/245; B21B 2003/001
USPC ........................................................ 585/240
See application file for complete search history.

(56) References Cited

U.S. PATENT DOCUMENTS

| 3,267,037 A | | 8/1966 | Bill et al. | |
|---|---|---|---|---|
| 4,882,077 A | * | 11/1989 | Cox | ..................... C10M 159/04 508/463 |
| 7,982,076 B2 | * | 7/2011 | Marker | ..................... C10G 3/46 585/240 |
| 8,142,527 B2 | * | 3/2012 | Herskowitz | ............... C10G 3/47 44/605 |
| 8,143,469 B2 | * | 3/2012 | Koivusalmi | .............. C10G 3/49 585/733 |
| 8,608,812 B2 | | 12/2013 | Perego et al. | |
| 9,845,432 B2 | | 12/2017 | Rispoli et al. | |
| 11,021,669 B2 | * | 6/2021 | China | ................ H01M 10/613 |
| 11,066,589 B2 | * | 7/2021 | Germanaud | ......... C10M 105/04 |
| 2006/0199985 A1 | * | 9/2006 | Kuechler | ............... C10G 50/00 585/1 |
| 2006/0264684 A1 | | 11/2006 | Petri et al. | |
| 2008/0051613 A1 | * | 2/2008 | Kato | ..................... C10M 101/02 585/16 |
| 2009/0111723 A1 | * | 4/2009 | Shibata | ................ C10M 105/04 508/463 |
| 2011/0287993 A1 | * | 11/2011 | Shibata | ................ C10M 105/12 508/583 |
| 2012/0010109 A1 | * | 1/2012 | Westelynck | .............. C09K 8/34 507/137 |
| 2012/0111079 A1 | * | 5/2012 | Genat | .................. C10M 173/00 72/54 |
| 2013/0167605 A1 | * | 7/2013 | Zhang | ................. B21B 45/0242 72/41 |
| 2014/0303057 A1 | | 10/2014 | Abhari et al. | |
| 2015/0191404 A1 | * | 7/2015 | Aalto | ...................... A61K 8/31 585/16 |

(Continued)

FOREIGN PATENT DOCUMENTS

| EP | 2368967 | 9/2011 |
|---|---|---|
| WO | 9804657 | 2/1998 |

*Primary Examiner* — Ellen M McAvoy
(74) *Attorney, Agent, or Firm* — Duane Morris LLP; Gregory M. Lefkowitz; Brandon A. Chan

(57) ABSTRACT

The invention is the use, as oil for aluminium and aluminium alloys cold rolling, of a fluid having a boiling point in the range of from 200° C. to 400° C. and a boiling range below 80° C., said fluid comprising more than 95% by weight isoparaffins and less than 3% by weight of naphthens, a biocarbon content of at least 95% by weight, containing less than 100 ppm by weight aromatics.

16 Claims, No Drawings

(56) References Cited

U.S. PATENT DOCUMENTS

| | | |
|---|---|---|
| 2016/0215229 A1* | 7/2016 | Wiersma .................. C09K 3/00 |
| 2016/0230105 A1* | 8/2016 | Wiersma ............... C10L 1/1616 |
| 2016/0230109 A1 | 8/2016 | Wiersma et al. |
| 2016/0281009 A1* | 9/2016 | Aubry .................... B01J 23/888 |
| 2017/0240832 A1* | 8/2017 | Hahn ................... C10M 101/02 |
| 2018/0327688 A1* | 11/2018 | Naitou ................. C10M 169/04 |

* cited by examiner

USE OF BIODEGRADABLE HYDROCARBON FLUIDS FOR ALUMINIUM COLD-ROLLING

CROSS-REFERENCE TO RELATED APPLICATIONS

This application is a § 371 national stage entry of International Application No. PCT/EP2017/077457, filed Oct. 26, 2017, which claims priority to European Application No. 16196116.4, filed Oct. 27, 2016, the entire contents of which are incorporated herein by reference.

FIELD OF THE INVENTION

The invention relates to the use of specific biodegradable fluids as neat oil for aluminium and aluminium alloys cold-rolling. The fluids as used in the invention, hereinafter referred to as being improved fluids, have a narrow boiling range and a very low aromatic content, and exhibit valuable properties making them especially suited for use as neat oil for cold rolling.

BACKGROUND ART

The metal processing industry relies on rolling fluids (or rolling oils) to manufacture foils and sheets of aluminum and its alloys. For decades, rolling fluids have been formulated from highly refined petroleum base oils (and, occasionally, water-based fluids) and select additives to improve film strength and other properties. This current generation of commercial rolling fluids was developed to enhance metal quality and mill productivity (throughput). Neat oils and water-soluble oils and emulsions are used in cold-rolling and hot-rolling.

Cold rolling is very diverse and can be of the Sendzimir type (e.g. 1-2, 1-2-3, 1-2-3-4), or of Z-high type (e.g. 2-high, 4-high, 6-high), and be a reversible mill, a tandem mill, etc.

The aluminium and aluminium alloys rolling industry expresses the need to maximize the efficiency of their rolled metal manufacturing process. In general terms, this means that there is a wish to operate at higher rolling speeds and to produce more marketable products per operating shift. Additionally, they also wish to minimize the number of passes through the mill taken to achieve a given level of reduction. Both these routes require that quality and surface finish be not compromised. Further, since the final aluminium sheet may be used to wrap food articles or may come in contact with food, it is necessary that any composition used in the rolling process complies with the legal specifications relating to the food industry. In addition, the final aluminium sheets must not be stained by the compositions used in the rolling process.

Benefits that are considered useful include lower rolling and reduced mill power (this allowing rolling harder non-ferrous alloys and/or allow higher reduction ratios); allowing one or two pass(es) reduction versus conventional oil lubrication; improving rolled surface finish by minimizing the sticking tendency of the strip when performing decoiling after thermal treatment.

High thermal conductivity and heat transfer rate are two important features for the products used in rolling, be it as neat oil, water-soluble oil, emulsion, cold or heat rolling.

Other properties are also looked for, especially it is preferable that oils be subject to minimal evaporation during use and offer a fast separation at the end of the process, and exhibit a controlled evaporation rate with a complete recovery. It is also useful that the oils do not promote deposits formation, resist oxidation and be pure oils, and the flash point is also important for safety reasons.

Metal-roller contacts are lubricated with rolling fluids to reduce friction as metal is processed under applied pressure at speeds up to several thousand meters per minute. Rolling fluids also help ensure efficient reduction of metal thickness in the minimum number of passes between rollers. These fluids are relatively light (low viscosity) to enhance the surface finish of the product and facilitate filtration to remove contaminants that can damage metal surfaces.

Document WO 2015/044289 discloses a Fischer-Tropsch derived gas oil fraction that can be used in solvent and functional fluid applications. Said document does not disclose a fluid having the defined biocarbon content. Additionally, said document does not disclose the use of the fluid as oil for aluminium and aluminium alloys cold rolling.

Document US 2014/0303057 discloses many different fluids, obtained by different processes. However, said document does not disclose the use of the fluid defined in the invention as oil for aluminium and aluminium alloys cold rolling.

Documents WO 98/04657 and U.S. Pat. No. 3,267,037 disclose fluids for cold rolling but do not disclose the fluid defined in the invention, in particular a fluid having the defined biocarbon content.

There remains a need for a neat oil for aluminium cold rolling that would be from biologic origin and not fossil, would be biodegradable yet exhibit improved properties useful for cold rolling.

SUMMARY OF THE INVENTION

The invention provides the use, as oil for aluminium and aluminium alloys cold rolling, of a fluid having a boiling point in the range of from 200° C. to 400° C. and a boiling range below 80° C., said fluid comprising more than 95% by weight isoparaffins and less than 3% by weight of naphthens, a biocarbon content of at least 95% by weight, containing less than 100 ppm by weight aromatics.

As well understood by the skilled person, a boiling range below 80° C. means that the difference between the final boiling point and the initial boiling point is less than 80° C.

According to one embodiment, the use is as a neat oil.

According to one embodiment, the use is for cold rolling of foils having a thickness from 10 to 0.15 mm or foils having a thickness from 1.5 to 0.06 mm.

According to one embodiment, the fluid has a viscosity measured at 40° C. ranging from 2 to 5 cSt, preferably from 2.5 to 4.5 cSt. More particularly, according to an embodiment, the fluid has a viscosity of about 2.5 cSt, or about 3 sCt or about 4 sCt.

According to one embodiment, the boiling point is in the range of from 220° C. to 340° C., preferably 240° C. to 340° C., more preferably the boiling range is 240° C.-275° C. or 250° C.-295° C. or 285° C.-335° C.

According to one embodiment, the fluid is obtainable by the process comprising the step of catalytically hydrogenating a feed comprising more than 95% by weight of a hydrodeoxygenated isomerized hydrocarbon biomass feedstock, at a temperature from 80 to 180° C., at a pressure from 50 to 160 bars, a liquid hourly space velocity of 0.2 to 5 hr$^{-1}$ and an hydrogen treat rate up to 200 Nm$^3$/ton of feed; preferably the feed comprises more than 98% by weight, preferably more than 99% by weight of a hydrodeoxygenated isomerized hydrocarbon biomass feedstock, and more preferably consists of a hydrodeoxygenated isomerized hydrocarbon biomass feedstock, and especially where the biomass is a vegetable oil, an ester thereof or a triglyceride thereof, the feed being more preferably a HVO feed, especially NEXBTL.

According to one variant, in the previous embodiment, a fractionating step is carried out before the hydrogenating step, or after the hydrogenating step or both.

According to one embodiment, the fluid contains less than 50 ppm by weight aromatics, and preferably less than 20 ppm by weight.

According to one embodiment, the fluid contains less than 1% by weight of naphthens, preferably less than 500 ppm and advantageously less than 50 ppm.

According to one embodiment, the fluid contains less than 5 ppm, even less than 3 ppm and preferably less than 0.5 ppm sulphur.

According to one embodiment, the fluid has a biodegradability at 28 days of at least 60%, preferably at least 70%, more preferably at least 75% and advantageously at least 80%, as measured according to the OECD 306 standard.

The improved fluids are especially suited for cold rolling, with viscosities that are dedicated viscosities for the rolling application.

The fluids are useful for strip mills and thin-strip mills, i.e. for thickness of 10 to 0.15 mm and 1.5 to 0.06 mm, respectively.

The improved fluid exhibits a specific combination of a defined (high) initial boiling point that ensures optimized consumption in the process (due to evaporation) and a defined final boiling point that ensures total and complete evaporation.

The narrow boiling range offers a better control of the viscosity during rolling, better stability during rolling, better distillation with scrubbing oil when using fume recovery system, less recondensation risks, and no problem with outside storage. The high flash point of the improved fluids is also very useful, especially for safety reasons.

The thermal conductivity and specific heat are also high, and superior to the ones of other mineral oils available for cold rolling. The improved fluids thus have improved capacity to cool down the working rolls, and thus delay the apparition of flatness defaults and heat wrinkles.

The productivity is thus improved with the fluids of the invention.

In use the improved fluids of the invention can also comprise any additive known in the art.

DESCRIPTION OF EMBODIMENTS OF THE INVENTION

Process for Manufacturing the Improved Fluids Used in the Invention

The invention makes use of an improved fluid having a boiling point in the range of from 200 to 400° C. and comprising more than 95% by weight isoparaffins and containing less than 100 ppm by weight aromatics, obtainable by the process comprising the step of catalytically hydrogenating a feed comprising more than 95% by weight of a hydrodeoxygenated isomerized hydrocarbon biomass feedstock, at a temperature from 80 to 180° C., at a pressure from 50 to 160 bars, a liquid hourly space velocity of 0.2 to 5 hr$^{-1}$ and an hydrogen treat rate up to 200 Nm$^3$/ton of feed.

According to a first variant, the feed comprises more than 98% by weight, preferably more than 99% by weight of a hydrodeoxygenated isomerized hydrocarbon biomass feedstock, and more preferably consists of a hydrodeoxygenated isomerized hydrocarbon biomass feedstock. According to an embodiment, the biomass is a vegetable oil, an ester thereof or a triglyceride thereof. According to an embodiment, the feed is a NEXBTL feed.

According to an embodiment, the hydrogenation conditions of the process are the following:
Pressure: 80 to 150 bars, and preferably 90 to 120 bars;
Temperature: 120 to 160° C. and preferably 150 to 160° C.;
Liquid hourly space velocity (LHSV): 0.4 to 3, and preferably 0.5 to 0.8 hr$^{-1}$;
Hydrogen treat rate be up to 200 Nm$^3$/ton of feed.

According to an embodiment, a fractionating step is carried out before the hydrogenating step, or after the hydrogenating step or both; according to an embodiment, the process comprises three hydrogenation stages, preferably in three separate reactors.

The invention thus discloses fluids having a boiling point in the range of from 200 to 400° C. and a boiling range below 80° C., said fluid comprising more than 95% by weight isoparaffins and less than 3% by weight of naphthens, a biodegradability at 28 days preferably of at least 60%, as measured according to the OECD 306 standard, a biocarbon content of at least 95% by weight, containing less than 100 ppm by weight aromatics, and preferably comprising carbon expressed as $CH_3$ sat less than 30%.

According to an embodiment, the fluid has a boiling point in the range 220 to 340° C. and advantageously more than 240° C. and up to 340° C.

The boiling point can be measured according to well-known methods for the skilled person. As an example, the boiling point can be measured according to ASTM D86 standard.

According to an embodiment, the fluid has a boiling range below 80° C., preferably below 60° C., more preferably between 35 and 50° C. and advantageously between 40 and 50° C.

According to an embodiment, the fluid contains less than 50 ppm by weight aromatics, and preferably less than 20 ppm by weight.

According to an embodiment, the fluid contains less than 1% by weight of naphthens, preferably less than 500 ppm and advantageously less than 50 ppm.

According to an embodiment, the fluid contains less than 5 ppm, even less than 3 ppm and preferably less than 0.5 ppm sulphur.

According to an embodiment, the fluid comprises more than 98% by weight isoparaffins.

According to an embodiment, the fluid has a ratio of iso-paraffins to n-paraffins of at least 20:1.

According to an embodiment, the fluid comprises more than 95% by weight of molecules with from 14 to 18 carbon atoms as isoparaffins, preferably comprises by weight, from 60 to 95%, more preferably 80 to 98%, of isoparaffins selected from the group consisting of C15 isoparaffins, C16 isoparaffins, C17 isoparaffins, C18 isoparaffins and mixtures of two or more thereof.

According to an embodiment, the fluid comprises:
C15 isoparaffins and C16 isoparaffins in a combined amount of 80 to 98%; or
C16 isoparaffins, C17 isoparaffins and C18 isoparaffins in a combined amount of 80 to 98%; or
C17 isoparaffins and C18 isoparaffins in a combined amount of 80 to 98%.

According to an embodiment, the fluid exhibits one or more, preferably all of the following features:

the fluid comprises carbon expressed as Cquat less than 3%, preferably less than 1% and more preferably about 0%;

the fluid comprises carbon expressed as CH sat less than 20%, preferably less than 18% and more preferably less than 15%;

the fluid comprises carbon expressed as $CH_2$ sat more than 40%, preferably more than 50% and more preferably more than 60%;

the fluid comprises carbon expressed as $CH_3$ sat less than 30%, preferably less than 28% and more preferably less than 25%;

the fluid comprises carbon expressed as $CH_3$ long chain less than 20%, preferably less than 18% and more preferably less than 15%;

the fluid comprises carbon expressed as $CH_3$ short chain less than 15%, preferably less than 10% and more preferably less than 9%.

The amount of isoparaffins, naphthens and/or aromatics can be determined according to any known methods for the skilled person. Among those methods, mention may be made of gas chromatography.

According to an embodiment, the fluid has a biodegradability at 28 days of at least 60%, preferably at least 70%, more preferably at least 75% and advantageously at least 80%, as measured according to the OECD 306 standard.

According to an embodiment, the fluid has a biocarbon content of at least 95% by weight, preferably at least 97%, more preferably at least 98%, and even more preferably about 100%.

The feedstock will first be disclosed, then the hydrogenation step and the associated fractionating step, and finally the improved fluids.

Feedstock

The feedstock or simply feed may, according a first variant, be a feed which is the result of a process of hydrodeoxygenation followed by isomerization, hereafter "HDO/ISO", as practiced on a biomass.

This HDO/ISO process is applied on biological raw materials, the biomass, selected from the group consisting of vegetable oils, animal fats, fish oils, and mixtures thereof, preferably vegetable oils. Suitable vegetable raw materials include rapeseed oil, canola oil, colza oil, tall oil, sunflower oil, soybean oil, hemp oil, olive oil, linenseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Condensation products, esters, or other derivatives obtained from biological raw materials may also be used as starting materials, as well as recycled oils such as Used Fired Methyl Ester Oils (UFOME). An especially preferred vegetable raw material is an ester or triglyceride derivative. This material is submitted to an hydrodeoxygenation (HDO) step for decomposing the structure of the biological ester or triglyceride constituent, and for removing oxygen, phosphorus and sulfur (part of) compounds, concurrently hydrogenating the olefinic bonds, followed by isomerization of the product thus obtained, thus branching the hydrocarbon chain and improving the low temperature properties of the thus-obtained feedstock.

In the HDO step, hydrogen gas and the biological constituent are passed to the HDO catalyst bed either in countercurrent or concurrent manner. In the HDO step, the pressure and the temperature range typically between 20 and 150 bar, and between 200 and 500° C., respectively. In the HDO step, known hydrodeoxygenation catalysts may be used. Prior to the HDO step, the biological raw material may optionally be subjected to prehydrogenation under milder conditions to avoid side reactions of the double bonds. After the HDO step, the product is passed to the isomerization step where hydrogen gas and the biological constituent to be hydrogenated, and optionally a n-paraffin mixture, are passed to the isomerization catalyst bed either in concurrent or countercurrent manner. In the isomerization step, the pressure and the temperature range between typically 20 and 150 bar, and between 200 and 500° C., respectively. In the isomerization step, isomerization catalysts known as such may be typically used.

Secondary process steps can also be present (such as intermediate pooling, scavenging traps, and the like).

The product issued from the HDO/ISO steps may for instance be fractionated to give the desired fractions.

Various HDO/ISO processes are disclosed in the literature. WO2014/033762 discloses a process which comprises a pre-hydrogenation step, a hydrodeoxygenation step (HDO) and an isomerization step which operates using the countercurrent flow principle. EP1728844 describes a process for the production of hydrocarbon components from mixtures of a vegetable or animal origin. The process comprises a pretreatment step of the mixture of a vegetable origin for removing contaminants, such as, for example, alkaline metal salts, followed by a hydrodeoxygenation (HDO) step and an isomerization step. EP2084245 describes a process for the production of a hydrocarbon mixture that can be used as diesel fuel or diesel component by the hydrodeoxygenation of a mixture of a biological origin containing fatty acid esters possibly with aliquots of free fatty acids, such as for example vegetable oils such as sunflower oil, rape oil, canola oil, palm oil, or fatty oils contained in the pulp of pine trees (tall oil), followed by hydroisomerization on specific catalysts. EP2368967 discloses such a process and the thus-obtained product.

Company Nesté Oy has developed specific HDO/ISO processes, and is currently marketing products thus obtained, under the tradename NexBTL® (diesel, aviation fuel, naphtha, isoalkane). This NexBTL® is an appropriate feed for use in the present invention. The NEXBTL feed is further described at http://en.wikipedia.org/wiki/NEXBTL and/or at the neste oy website.

The desired fraction(s) may subsequently be isolated for instance by distillation.

Feedstocks typically contain less than 15 ppm of sulphur, preferably less than 8 ppm and more preferably less than 5 ppm, especially less than 1 ppm, as measured according to EN ISO 20846. Typically the feedstocks will comprise no sulphur as being biosourced products.

Before entering the hydrogenation unit, a pre-fractionation step can take place. Having a more narrow boiling range entering the unit allows having a more narrow boiling range at the outlet. Indeed typical boiling points of pre-fractionated cuts are in the range of from 220 to 330° C. while cuts without a pre-fractionating step typically have a boiling point in the range of from 150° C. to 360° C.

Hydrogenation Step

The feedstock issued from HDO/ISO is then hydrogenated. The feedstock can optionally be pre-fractionated.

Hydrogen that is used in the hydrogenation unit is typically a high purity hydrogen, e.g. with a purity of more than 99%, albeit other grades can be used.

Hydrogenation takes place in one or more reactors. The reactor can comprise one or more catalytic beds. Catalytic beds are usually fixed beds.

Hydrogenation takes place using a catalyst. Typical hydrogenation catalysts include but are not limited to: nickel, platinum, palladium, rhenium, rhodium, nickel tungstate, nickel molybdenum, molybdenum, cobalt molybdenate, nickel molybdenate on silica and/or alumina carriers or zeolites. A preferred catalyst is Ni-based and is supported on an alumina carrier, having a specific surface area varying between 100 and 200 m$^2$/g of catalyst.

The hydrogenation conditions are typically the following:
Pressure: 50 to 160 bars, preferably 80 to 150 bars, and most preferably 90 to 120 bars or 100 to 150 bars;
Temperature: 80 to 180° C., preferably 120 to 160° C. and most preferably 150 to 160° C.;
Liquid hourly space velocity (LHSV): 0.2 to 5 hr$^{-1}$, preferably 0.4 to 3, and most preferably 0.5 to 0.8;
Hydrogen treat rate: adapted to the above conditions, which can be up to 200 Nm$^3$/ton of feed.

The temperature in the reactors can be typically about 150-160° C. and the pressure can be typically about 100 bars while the liquid hourly space velocity can be typically about 0.6 h$^{-1}$ and the treat rate is adapted, depending on the feed quality and the first process parameters.

The hydrogenation process of the invention can be carried out in several stages. There can be two or three stages, preferably three stages, preferably in three separate reactors. The first stage will operate the sulphur trapping, hydrogenation of substantially all unsaturated compounds, and up to about 90% of hydrogenation of aromatics. The flow exiting from the first reactor contains substantially no sulphur. In the second stage the hydrogenation of the aromatics continues, and up to 99% of aromatics are hydrogenated. The third stage is a finishing stage, allowing an aromatic content as low as 100 ppm by weight or even less such as below 50 ppm, more preferably less than 20 ppm, even for high boiling products.

The catalysts can be present in varying or substantially equal amounts in each reactor, e.g. for three reactors according to weight amounts of 0.05-0.5/0.10-0.70/0.25-0.85, preferably 0.07-0.25/0.15-0.35/0.4-0.78 and most preferably 0.10-0.20/0.20-0.32/0.48-0.70.

It is also possible to have one or two hydrogenation reactors instead of three.

It is also possible that the first reactor be made of twin reactors operated alternatively in a swing mode. This may be useful for catalyst charging and discharging: since the first reactor comprises the catalyst that is poisoned first (substantially all the sulphur is trapped in and/or on the catalyst) it should be changed often.

One reactor can be used, in which two, three or more catalytic beds are installed.

It may be necessary to insert quenches on the recycle to cool effluents between the reactors or catalytic beds to control reaction temperatures and consequently hydrothermal equilibrium of the hydrogenation reaction. In a preferred embodiment, there is no such intermediate cooling or quenching.

In case the process makes use of 2 or 3 reactors, the first reactor will act as a sulphur trap. This first reactor will thus trap substantially all the sulphur. The catalyst will thus be saturated very quickly and may be renewed from time to time. When regeneration or rejuvenation is not possible for such saturated catalyst the first reactor is considered as a sacrificial reactor which size and catalyst content both depend on the catalyst renewal frequency.

In an embodiment the resulting product and/or separated gas is/are at least partly recycled to the inlet of the hydrogenation stages. This dilution helps, if this were to be needed, maintaining the exothermicity of the reaction within controlled limits, especially at the first stage. Recycling also allows heat-exchange before the reaction and also a better control of the temperature.

The stream exiting the hydrogenation unit contains the hydrogenated product and hydrogen. Flash separators are used to separate effluents into gas, mainly remaining hydrogen, and liquids, mainly hydrogenated hydrocarbons. The process can be carried out using three flash separators, one of high pressure, one of medium pressure, and one of low pressure, very close to atmospheric pressure.

The hydrogen gas that is collected on top of the flash separators can be recycled to the inlet of the hydrogenation unit or at different levels in the hydrogenation units between the reactors.

Because the final separated product is at about atmospheric pressure, it is possible to feed directly the fractionation stage, which is preferably carried out under vacuum pressure that is at about between 10 to 50 mbars, preferably about 30 mbars.

The fractionation stage can be operated such that various hydrocarbon fluids can be withdrawn simultaneously from the fractionation column, and the boiling range of which can be predetermined.

Therefore, fractionation can take place before hydrogenation, after hydrogenation, or both.

The hydrogenation reactors, the separators and the fractionation unit can thus be connected directly, without having to use intermediate tanks. By adapting the feed, especially the initial and final boiling points of the feed, it is possible to produce directly, without intermediate storage tanks, the final products with the desired initial and final boiling points. Moreover, this integration of hydrogenation and fractionation allows an optimized thermal integration with reduced number of equipment and energy savings.

Fluids Used in the Invention

The fluids used in the invention, hereafter referred to simply as "the improved fluids" possess outstanding properties, in terms of aniline point or solvency power, molecular weight, vapour pressure, viscosity, defined evaporation conditions for systems where drying is important, and defined surface tension.

The improved fluids are primarily isoparaffinic and contain more than 95% by weight isoparaffins, preferably more than 98% by weight.

The improved fluids typically contain less than 3% by weight of naphthens, preferably less than 1% and advantageously less than 500 ppm and even less than 50 ppm by weight.

Typically, the improved fluids comprise carbon atoms number from 6 to 30, preferably 8 to 24 and most preferably from 9 to 20 carbon atoms. The fluids especially comprise a majority, i.e. more than 90% by weight, of molecules with from 14 to 18 carbon atoms as isoparaffins. Preferred improved fluids are those comprising by weight, from 60 to 95%, preferably 80 to 98%, of isoparaffins selected from the group consisting of C15 isoparaffins, C16 isoparaffins, C17 isoparaffins, C18 isoparaffins and mixtures of two or more thereof.

Preferred improved fluids comprise:
C15 isoparaffins and C16 isoparaffins in a combined amount of 80 to 98%; or C16 isoparaffins, C17 isoparaffins and C18 isoparaffins in a combined amount of 80 to 98%; or C17 isoparaffins and C18 isoparaffins in a combined amount of 80 to 98%.

Examples of preferred improved fluids are those comprising:

from 30 to 70% of C15 isoparaffins and from 30 to 70% C16 isoparaffins, preferably from 40 to 60% of C15 isoparaffins and from 35 to 55% C16 isoparaffins;

from 5 to 25% of C15 isoparaffins, from 30 to 70% C16 isoparaffins and from 10 to 40% of C17 isoparaffins, preferably from 8 to 15% of C15 isoparaffins, from 40 to 60% C16 isoparaffins and from 15 to 25% of C17 isoparaffins;

from 5 to 30% of C17 isoparaffins and from 70 to 95% C18 isoparaffins, preferably from 10 to 25% of C17 isoparaffins and from 70 to 90% C18 isoparaffins.

The improved fluids exhibit a specific branching distribution.

Branching rates of isoparaffins as well as carbon distribution is determined using the NMR method (as well as GC-MS) and determination of each type of carbon (with no hydrogen, with one, two or three hydrogens). C quat sat represents the saturated quaternary carbon, CH sat represents the saturated carbon with one hydrogen, $CH_2$ sat represents the saturated carbon with two hydrogens, $CH_3$ sat represents the saturated carbon with three hydrogens, $CH_3$ long chain and $CH_3$ short chain represent the $CH_3$ group on a long chain and a short chain, respectively where the short chain is one methyl group only and a long chain is a chain having at least two carbons. The sum of $CH_3$ long chain and $CH_3$ short chain is $CH_3$ sat.

The improved fluids typically comprise carbon expressed as Cquat less than 3%, preferably less than 1% and more preferably about 0%.

The improved fluids typically comprise carbon expressed as CH sat less than 20%, preferably less than 18% and more preferably less than 15%.

The improved fluids typically comprise carbon expressed as $CH_2$ sat more than 40%, preferably more than 50% and more preferably more than 60%.

The improved fluids typically comprise carbon expressed as $CH_3$ sat less than 30%, preferably less than 28% and more preferably less than 25%.

The improved fluids typically comprise carbon expressed as $CH_3$ long chain less than 20%, preferably less than 18% and more preferably less than 15%.

The improved fluids typically comprise carbon expressed as $CH_3$ short chain less than 15%, preferably less than 10% and more preferably less than 9%.

The improved fluids have a boiling point in the range of from 200 to 400° C. and also exhibit an enhanced safety, due to the very low aromatics content.

The improved fluids typically contain less than 100 ppm, more preferably less than 50 ppm, advantageously less than 20 ppm aromatics (measured using a UV method). This is especially useful for high temperature boiling products, typically products having a boiling point in the range 300-400° C., preferably 320-380° C.

The boiling range of the improved fluids is preferably not more than 80° C., preferably not more than 70° C., more preferably not more than 60° C., even more preferably between 35 and 50° C. and advantageously between 40 and 50° C.

The improved fluids also have an extremely low sulphur content, typically less than 5 ppm, even less than 3 ppm and preferably less than 0.5 ppm, at a level too low to be detected by the usual low-sulphur analyzers.

The Initial Boiling Point (IBP) to Final Boiling Point (FBP) range is selected according to the particular use and composition. An Initial Boiling Point of more than 250° C. allows classification as free of VOC (Volatile Organic Compounds) according to the directive 2004/42/CE.

Biodegradation of an organic chemical refers to the reduction in complexity of the chemical through metabolic activity of microorganisms. Under aerobic conditions, microorganisms convert organic substances into carbon dioxide, water and biomass. OECD 306 method, is available for assessing biodegradability of individual substances in seawater. OECD Method 306 can be carried out as either a shake flask or Closed Bottle method and the only microorganisms added are those microorganisms in the test seawater to which the test substance is added. In order to assess the biotic degradation in seawater, a biodegradability test was performed which allows the biodegradability to be measured in seawater. The biodegradability was determined in the Closed Bottle test performed according to the OECD 306 Test Guidelines. The biodegradability of the improved fluids is measured according to the OECD Method 306.

The OECD Method 306 is the following:

The closed bottle method consists on dissolution of a pre-determined amount of the test substance in the test medium in a concentration of usually 2-10 mg/l, with one or more concentrations being optionally used. The solution is kept in a filled closed bottle in the dark in a constant temperature bath or enclosure controlled within a range of 15-20° C. The degradation is followed by oxygen analyses over a 28-day period. Twenty-four bottles are used (8 for test substance, 8 for reference compound and 8 for sweater plus nutriment). All analyses are performed on duplicate bottles. Four determinations of dissolved oxygen, at least, are performed (day 0, 5, 15 and 28) using a chemical or electrochemical method.

Results are thus expressed in % degradability at 28 days. The improved fluids have a biodegradability at 28 days of at least 60%, as measured according to the OECD 306 standard, preferably at least 70% by weight, more preferably at least 75% and advantageously at least 80%.

The invention uses the products of natural origin like starting products. The carbon of a biomaterial comes from the photosynthesis of the plants and thus of atmospheric $CO_2$. The degradation (by degradation, one will understand also combustion/incineration at the end of the lifetime) of these $CO_2$ materials thus does not contribute to the warming since there is no increase in the carbon emitted in the atmosphere. The assessment $CO_2$ of the biomaterials is thus definitely better and contributes to reduce the print carbon of the products obtained (only energy for manufacture is to be taken into account). On the contrary, a fossil material of origin being also degraded out of $CO_2$ will contribute to the increase in the $CO_2$ rate and thus to climate warming. The improved fluids according to the invention will thus have a print carbon which will be better than that of compounds obtained starting from a fossil source.

The invention thus improves also the ecological assessment during the manufacture of the improved fluids. The term of "bio-carbon" indicates that carbon is of natural origin and comes from a biomaterial, as indicated hereafter. The content of biocarbon and the content of biomaterial are expressions indicating the same value.

A renewable material of origin or biomaterial is an organic material in which carbon comes from $CO_2$ fixed recently (on a human scale) by photosynthesis starting from the atmosphere. On ground, this $CO_2$ is collected or fixed by the plants. At sea, $CO_2$ is collected or fixed by microscopic bacteria or plants or algae carrying out a photosynthesis. A biomaterial (carbon natural origin 100%) presents an isotopic ratio $^{14}C/^{12}C$ higher than $10^{-12}$, typically about $1.2 \times 10^{-12}$, while a fossil material has a null ratio. Indeed, the isotope $^{14}C$ is formed in the atmosphere and is then integrated by photosynthesis, according to a scale of time of a few tens of years at the maximum. The half-life of $^{14}C$ is 5730 years. Thus the materials resulting from photosynthesis, namely the plants in a general, way, have necessarily a maximum content of isotope $^{14}C$.

The determination of the content of biomaterial or content of biocarbon is given pursuant to standards ASTM D 6866-12, method B (ASTM D 6866-06) and ASTM D 7026 (ASTM D 7026-04). Standard ASTM D 6866 concerns "Determining the Biobased Content of Natural Range Materials Using Radiocarbon and Isotope Ratio Mass Spectrometry Analysis", while standard ASTM D 7026 concerns "Sampling and Reporting of Results for Determination of Biobased Content of Materials via Carbon Isotope Analysis". The second standard mentions the first in its first paragraph.

The first standard describes a test of measurement of the ratio $^{14}C/^{12}C$ of a sample and compares it with the ratio $^{14}C/^{12}C$ of a sample renewable reference of origin 100%, to give a relative percentage of C of origin renewable in the sample. The standard is based on the same concepts that the dating with $^{14}C$, but without making application of the equations of dating. The ratio thus calculated is indicated as the "pMC" (percent Modem Carbon). If the material to be analyzed is a mixture of biomaterial and fossil material (without radioactive isotope), then the value of pMC obtained is directly correlated with the quantity of biomaterial present in the sample. The value of reference used for the dating to $^{14}C$ is a value dating from the years 1950. This year was selected because of the existence of nuclear tests in the atmosphere which introduced great quantities of isotopes into the atmosphere after this date. The reference 1950 corresponds to a value pMC of 100. Taking into account the thermonuclear tests, the current value to be retained is approximately 107.5 (what corresponds to a factor of correction of 0.93). The signature into radioactive carbon of a current plant is thus of 107.5. A signature of 54 pMC and 99 pMC thus correspond to a quantity of biomaterial in the sample of 50% and 93%, respectively.

The compounds according to the invention come at least partly from biomaterial and thus present a content of biomaterial from at least 95%. This content is advantageously even higher, in particular more than 98%, more preferably more than 99% and advantageously about 100%. The compounds according to the invention can thus be bio-carbon of 100% biosourced or on the contrary to result from a mixture with a fossil origin. According to an embodiment, the isotopic ratio $^{14}C/^{12}C$ is between 1.15 and $1.2 \times 10^{-12}$.

All percentages and ppm are by weight unless indicated to the contrary. Singular and plural are used interchangeably to designate the fluid(s).

The following example illustrates the invention without limiting it.

EXAMPLE

A feedstock being a NEXBTL feedstock (isoalkane) is used in the process of the invention. The following conditions for hydrogenation are used:

The temperature in the reactors is about 150-160° C.; the pressure is about 100 bars and the liquid hourly space velocity is 0.6 $h^{-1}$; the treat rate is adapted. The catalyst used is nickel on alumina.

Fractionating is carried out to provide 3 fluids to be used in the invention.

The resulting products have been obtained, with the following properties.

The following standards have been used to determine the following properties:

| | |
|---|---|
| Flash point | EN ISO 2719 |
| Pour point | EN ISO 3016 |
| Density at 15° C. | EN ISO 1185 |
| Viscosity at 40° C. | EN ISO 3104 |
| Aniline point | EN ISO 2977 |
| Thermal conductivity[1] | Internal Flash method |
| Specific heat[2] | Method by calorimetry |

1. A specific apparatus is used, comprising two tubes of aluminium, one inner and one outer. The fluid to be measured is placed in the annular space between the two tubes. An energy pulse (dirac type) is applied on the inner tube and the temperature is measured on the outer tube, whereby a thermogram is obtained.

Knowing the thermal diffusivity, density and specific heat of two layers of the two tubes of aluminium as a function of temperature, and knowing the density and specific heat of the fluid to be analysed, one can deduce the thermal conductivity Lambda of the fluid as a function of temperature.

Calibration of the Apparatus

The apparatus is first calibrated with a reference sample, SERIOLA 1510 (heat transfer medium) at different temperatures. The different thermal properties were measured separately before.

Sample Preparation

The sample is mixed and introduced (using syringe) into the annular space between the two tubes. The loaded apparatus is then placed in a chamber regulated in temperature.

Measurement Protocol

For each temperature measurement, the following procedure is followed. The sample is stabilized at a given temperature. Then light flashes are applied on the inner face of the inner tube and the rise in temperature of the outer face of the outer tube is recorded over time.

Based on average values obtained with at least 3 measures at each given temperature, the thermal conductivity is calculated.

2. The specific heat is measured using a DSC calorimeter (DSC NETZSCH 204 Phoenix), which is compliant with standards ISO 113587, ASTM E1269, ASTM E968, ASTM E793, ASTM D3895, ASTM D3417, ASTM D3418, DIN 51004, DIN 51007 and DIN 53765.

| Characteristic | Ex.1 | Ex.2 | Ex.3 |
|---|---|---|---|
| Aromatic content (ppm) | <20 | <20 | <20 |
| Sulfur content (ppm) | 0.1 | 0.1 | 0.11 |
| % isoparaffins (w/w) | 98.9 | 95.1 | 96.2 |
| % n-paraffins (w/w) | 1.1 | 4.9 | 3.8 |

-continued

| Characteristic | Ex.1 | Ex.2 | Ex.3 |
|---|---|---|---|
| % naphthenic (w/w) | 0 | 0 | 0 |
| C15 (iso) | 48.35 | 11.45 | 0 |
| C16 (iso) | 42.80 | 47.89 | 1.58 |
| C17 (iso) | 2.52 | 18.57 | 14.17 |
| C18 (iso) | 0.38 | 17.07 | 79.69 |
| C quat sat | 0 | 0 | 0 |
| CH sat | 12.1 | 10.9 | 10.2 |
| $CH_2$ sat | 64.9 | 67.8 | 70.7 |
| $CH_3$ sat | 22.9 | 21.2 | 19.1 |
| $CH_3$ long chain | 14.2 | 13.3 | 12 |
| $CH_3$ short chain | 8.7 | 8 | 7.1 |
| Biocarbon content (%) | 97 | 97 | 98 |
| Initial Boiling Point (° C.) | 247.0 | 259.5 | 293.6 |
| 5% point (° C.) | 255.7 | 270.2 | 296.7 |
| 50% point (° C.) | 258.9 | 274.5 | 298.5 |
| 95% point (° C.) | 266.8 | 286.4 | 305.3 |
| Dry point (° C.) | 269.0 | 287.5 | 324.1 |
| OECD biodegradability (28 days) (%) | 80 | 83 | 83 |
| Flash point (° C.) | 115 | 125 | 149.5 |
| Density at 15° C. (kg/m3) | 776.4 | 780.3 | 787.2 |
| Viscosity at 40° C. ($mm^2$/s) | 2.495 | 2.944 | 3.870 |
| Aniline point (° C.) | 93.2 | 95.7 | 99.5 |
| Pour Point (° C.) | −81 | −60 | −45 |
| Thermal conductivity Lambda (at ° C. in W/(m · K)) | 28/0.130 73/0.125 128/0.124 | 27/0.135 73/0.128 127/0.126 | 23/0.138 88/0.137 158/0.127 |
| Specific heat (at ° C. in J/(kg · K)) | 30.3/2154 74.8/2336 129.2/2540 | 31.3/2202 74.8/2324 129.2/2503 | 31.3/2185 89.7/2377 158.9/2695 |

The three fluids also are colorless, odorless, have a purity according to the European Pharmacopoeia suitable for food grade application, and are solvent class A according to CEN/TS 16766.

These results show that the improved fluid described in the invention is especially suited for cold rolling.

The aniline values are indicative of high solvency power.

The thermal conductivity values are indicative of a conductivity that is superior to the one of standard mineral oils, at the same viscosity (by up to 7%), the heat transfer rate is improved. The specific heat is superior to the one of standard mineral oils (by up to 11%).

The invention claimed is:

1. Method for aluminium and aluminium alloys cold rolling, said method comprising:
    using, as a cold rolling oil, a fluid comprising more than 95% by weight isoparaffins and less than 3% by weight of naphthenes, a biocarbon content of at least 95% by weight, containing less than 100 ppm by weight aromatics, wherein the boiling range of the fluid is selected from 240° C.-275° C., 250° C.-295° C. or 285° C.-335° C.

2. Method of claim 1, comprising:
    using the fluid as a neat oil.

3. Method of claim 1, comprising:
    cold rolling foils having a thickness from 10 to 0.15 mm.

4. Method of claim 1, wherein the fluid has a viscosity at 40° C. of about 2.5 cSt.

5. Method of claim 1, wherein the fluid contains less than 50 ppm by weight aromatics.

6. Method of claim 1, wherein the fluid contains less than 1% by weight of naphthenes by weight.

7. Method of claim 1, wherein the fluid contains less than 5 ppm sulphur.

8. Method of claim 1, wherein the fluid has a biodegradability at 28 days of at least 60%, as measured according to the OECD 306 standard.

9. Method of claim 1, wherein the fluid contains less than 500 ppm of naphthenes, less than 20 ppm of aromatics, and less than 3 ppm of sulphur.

10. Method of claim 1, wherein the fluid contains less than 500 ppm by weight of naphthenes.

11. Method of claim 1, wherein the fluid contains less than 50 ppm by weight of aromatics and less than 500 ppm by weight of naphthenes.

12. Method of claim 1, wherein the fluid contains less than 20 ppm by weight of aromatics and less than 50 ppm by weight of naphthenes.

13. Method of claim 1, comprising cold rolling foils having a thickness from 1.5 to 0.06 mm.

14. Method of claim 1, wherein the fluid has a viscosity at 40° C. of about 3 cSt.

15. Method of claim 1, wherein the fluid has a viscosity at 40° C. of about 4 cSt.

16. Method for aluminium and aluminium alloys cold rolling, said method comprising:
    using, as a cold rolling oil, a fluid having an initial boiling point and a final boiling point in the range of from 240° C. to 340° C., a viscosity at 40° C. from about 2.5 cSt to about 4 cSt, and a boiling range below 80° C., said fluid comprising more than 95% by weight isoparaffins and less than 3% by weight of naphthenes, a biocarbon content of at least 95% by weight, containing less than 100 ppm by weight aromatics.

* * * * *